(12) United States Patent
Inotay et al.

(10) Patent No.: US 9,524,407 B2
(45) Date of Patent: Dec. 20, 2016

(54) SYSTEMS AND METHODS FOR END-TO-END SECURE LINK BETWEEN A NEAR-FIELD COMMUNICATION (NFC) CHIP AND SERVER

(71) Applicant: Cellum Innovacios es Szolgaltato Zrt., Budapest (HU)

(72) Inventors: Balazs Inotay, Budapest (HU); Zoltan Acs, Budapest (HU); Laszlo Magyar, Budapest (HU)

(73) Assignee: CELLUM INNOVACIOS ES SZOLGALTATO ZRT., Budapest (HU)

( * ) Notice: Subject to any disclaimer, the term of this patent is extended or adjusted under 35 U.S.C. 154(b) by 38 days.

(21) Appl. No.: 14/456,653

(22) Filed: Aug. 11, 2014

(65) Prior Publication Data

US 2016/0042207 A1   Feb. 11, 2016

(51) Int. Cl.
*G06K 7/10* (2006.01)
*H04B 5/00* (2006.01)
(Continued)

(52) U.S. Cl.
CPC ....... *G06K 7/10257* (2013.01); *G06K 7/10297* (2013.01); *H04B 5/0056* (2013.01);
(Continued)

(58) Field of Classification Search
None
See application file for complete search history.

(56) References Cited

U.S. PATENT DOCUMENTS

| 8,132,722 B2 * | 3/2012 | Buer | G06Q 20/341 |
| | | | 235/380 |
| 8,706,081 B1 * | 4/2014 | Paya | H04M 1/7253 |
| | | | 455/41.1 |

(Continued)

FOREIGN PATENT DOCUMENTS

EP   2 624 612 A1   8/2013

OTHER PUBLICATIONS

International Search Report and Written Opinion mailed Oct. 29, 2015 in PCT Application No. PCT/IB2015/056085.

*Primary Examiner* — K Wong
(74) *Attorney, Agent, or Firm* — Foley & Lardner LLP; Christopher J. McKenna

(57) ABSTRACT

Systems and method of the present solution are directed to authenticating and updating a near-field-communication (NFC) chip over a network. According to one aspect, a method of authenticating and updating a NFC chip over a network includes identifying, by a device, a NFC chip of the device. The NFC chip is configured with an identification code established by a NFC server to uniquely identify the NFC chip. The method includes sending, by the device, a signal that includes the identification code over a network to the NFC server. The method further includes establishing a secure communication link over the network between the NFC server and the device responsive to authenticating the NFC chip by the NFC server via the identification code. The method also includes receiving, by the device via the secure communication link, data from the NFC server to store to the NFC chip and storing, by the device, the data to the NFC chip.

31 Claims, 9 Drawing Sheets

(51) Int. Cl.
*H04W 4/00* (2009.01)
*H04L 29/06* (2006.01)
*H04W 12/06* (2009.01)

(52) U.S. Cl.
CPC ......... *H04L 63/0492* (2013.01); *H04W 4/008* (2013.01); *H04W 12/06* (2013.01)

(56) References Cited

U.S. PATENT DOCUMENTS 9,112,546 B2 * 8/2015 Orsatti ..................... H04B 5/02
2013/0305035 A1 11/2013 Lyne et al.

* cited by examiner

SYSTEMS AND METHODS FOR END-TO-END SECURE LINK BETWEEN A NEAR-FIELD COMMUNICATION (NFC) CHIP AND SERVER

A portion of the disclosure of this patent document contains material which is subject to copyright protection. The copyright owner has no objection to the facsimile reproduction by anyone of the patent document or the patent disclosure, as it appears in the file or records of the Patent and Trademark Office, but otherwise reserves all copyright rights whatsoever.

BACKGROUND OF THE DISCLOSURE

Near field communication (NFC) is a set of standards for smartphones and similar devices to establish radio communication with each other by touching them together or bringing them into proximity, usually no more than a few inches. Present and anticipated applications include contactless transactions, data exchange, and simplified setup of more complex communications such as Wi-Fi. Communication is also possible between an NFC device and an unpowered NFC chip, called a tag. However, NFC has not been as widely adopted as other short range communications technologies, in part, due to issues with security.

BRIEF SUMMARY OF THE DISCLOSURE

The present solution is directed to an architecture, procedure and implementation for emulating, authenticating and updating a near-field-communication (NFC) chip over a network. According to one aspect, a method of authenticating and updating a NFC chip over a network includes identifying, by a device, a NFC chip of the device. The NFC chip is configured with an identification code established by a NFC server to uniquely identify the NFC chip. The method includes sending, by the device, a signal that includes the identification code over a network to the NFC server. The method further includes establishing a secure communication link over the network between the NFC server and the device responsive to authenticating the NFC chip by the NFC server via the identification code. The method also includes receiving, by the device via the secure communication link, data from the NFC server to store to the NFC chip and storing, by the device, the data to the NFC chip.

In some implementations, the method can include writing, by the NFC server, the identification code to the NFC chip when the NFC chip is locally coupled to the NFC server. In some implementations, the method can include identifying, by the device, the NFC chip via NFC aerials. In some implementations, sending, by the device, a signal that includes the identification code over a network to the NFC server includes sending, by the device, the signal responsive to identifying the NFC chip. In some implementations, sending, by the device, a signal that includes the identification code over a network to the NFC server includes sending, by the device, the signal over a mobile network.

In some implementations, establishing a secure communication link over the network between the NFC server and the device includes establishing, by the NFC server and an agent executing on the device, the secure communication channel over a mobile network. In some implementations, establishing a secure communication link over the network between the NFC server and the device includes identifying, by the NFC server, the device and using the identification of the device with the identification code to authenticate the NFC chip.

In some implementations, receiving, by the device via the secure communication link, data from the NFC server to store to the NFC chip includes receiving, by an agent executing on the device and in communication with the NFC chip, the data. In some implementations, the method further includes writing, by the agent, the data to the NFC chip via NFC aerials. In some implementations, the NFC chip is part of a card in communication with the device.

According to another aspect, a system of authenticating and updating a near-field-communication (NFC) chip over a network includes a device configured to identify a NFC chip of the device. The system also includes an NFC server configured to authenticate and update the NFC chip. The NFC chip can be configured with an identification code established by a NFC server to uniquely identify the NFC chip. The device is configured to send a signal comprising the identification code over a network to the NFC server. The NFC server and the device establish a secure communication link over the network responsive to authenticating the NFC chip by the NFC server via the identification code. The device is configured to receive via the secure communication link, data from the NFC server to store to the NFC chip and store the data to the NFC chip.

In some implementations, the NFC server is configured to write the identification code to the NFC chip when locally coupled with the NFC chip. In some implementations, the device is further configured to identify the NFC chip via NFC aerials. In some implementations, the device is further configured to send the signal responsive to identifying the NFC chip.

In some implementations, the device is further configured to send the signal over a mobile network. In some implementations, the NFC server and an agent executing on the device are configured to establish the secure communication channel over a mobile network.

In some implementations, the NFC server is further configured to identify the device and to use the identification of the device with the identification code to authenticate the NFC chip. In some implementations, an agent executing on the device and in communication with the NFC chip is configured to receive the data. In some implementations, the agent is further configured to write the data to the NFC chip via NFC aerials. In some implementations, the NFC chip is part of a card in communication with the device.

According to one aspect of the disclosure, a method of emulating a near-field-communication (NFC) chip over a network includes identifying, by a device, a near-field-communication (NFC) chip of a reader device. The NFC chip can be configured with an identification code to uniquely identify the reader device. The method can also include sending, by the device, a signal over a network to a NFC server. The signal can include the identification code. The method can also include establishing a secure communication link between the NFC server and the NFC chip through the device responsive to authenticating the device by the NFC server. In some implementations, the method also includes receiving, by the device via the secure communication link, data from the NFC server to provide to the NFC chip, and providing, by the device via the secure communication link, the data to the NFC chip.

In some implementations, the method also includes writing, by the NFC server, the identification code to the NFC chip when the NFC chip is locally coupled to the NFC server. The method can include identifying, by the device, the NFC chip via NFC aerials.

In certain implementations, the method includes sending over a mobile network, by the device, the signal responsive to identifying the NFC chip. The method can include establishing, by the NFC server and an agent executing on the device, the secure communication channel over a mobile network. The method can also include identifying, by the NFC server, the device and using an identification of the device with the identification code to authenticate the device.

In some implementations, the method includes receiving, by an agent executing on the device and in communication with the NFC chip, the data. The method can also include sending and receiving, by the agent, the data to the NFC chip via NFC aerials.

According to another aspect of the disclosure, a system of emulating a near-field-communication (NFC) chip over a network includes a device configured to identify a near-field-communication (NFC) chip of a reader device and transmit a signal over a network to a NFC server. The system also includes the NFC server, which can be configured to authenticate the device and establish a secure communication link, via the device, with the NFC chip of the reader device. Establishment of the secure communication link can be made responsive to authenticating the device. The NFC server can also be configured to transmit data to the device, and the device is configured to provide the data to the NFC chip.

In some implementations, the NFC server can be configured to write the identification code to the NFC chip when locally coupled with the NFC chip. The device can be configured to identify the NFC chip via NFC aerials. The device can be configured to send the signal over a mobile network responsive to identifying the NFC chip. The NFC server and an agent executing on the device can be configured to establish the secure communication channel over a mobile network. The NFC server can identify the device and to use the identification of the device with the identification code to authenticate the NFC chip.

In some implementations, the agent executing on the device and in communication with the NFC chip can receive the data from the NFC server. The agent can send and receive the data to the NFC chip via NFC aerials.

According to another aspect of the disclosure, a method of updating a near-field-communication (NFC) chip over a network can include identifying, by a device, a near-field-communication (NFC) chip. The method can also include establishing a secure communication link between a NFC server and the device. The method may also include receiving a first data from the NFC chip to be transmitted to the NFC server, and transmitting the first data received from the NFC chip to the NFC server over the secure communication link.

In some implementations, the method can include identifying, the NFC chip by an identification code that uniquely identifies the NFC chip. The NFC chip may be identified via NFC aerials. The method can also include establishing the secure communication link between the NFC server and the device over a mobile network.

In some implementations, the method includes receiving a second data from the NFC server responsive to the NFC server receiving the first data from the device. The second data can be transmitted to the NFC chip. The second data can be sent to the NFC chip by the device.

According to another aspect of the disclosure, a system of updating a near-field-communication (NFC) chip over a network can include a device. The device can be configured to identify a near-field-communication (NFC) chip, transmit a signal over a network to a NFC server; and receive a first data from the NFC chip to be transmitted to the NFC server over the network. The system can also include the NFC server configured to receive the first data from the device and transmit a second data to the device responsive to receiving the first data.

In some implementations, the device can transmit the second data to the NFC chip. The device may also be able to identify the NFC chip by an identification code that uniquely identifies the NFC chip. The device may include an agent configured to establish a secure communication link between the NFC server and the device over a mobile network. The device may also be configured to send the second data to the NFC chip.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful Section A describes a network environment and computing environment which may be useful for practicing embodiments described herein.

Section B describes embodiments of systems and methods for authenticating and updating a near-field-communication (NFC) chip over a network.

A. Computing and Network Environment

Figure 1A:
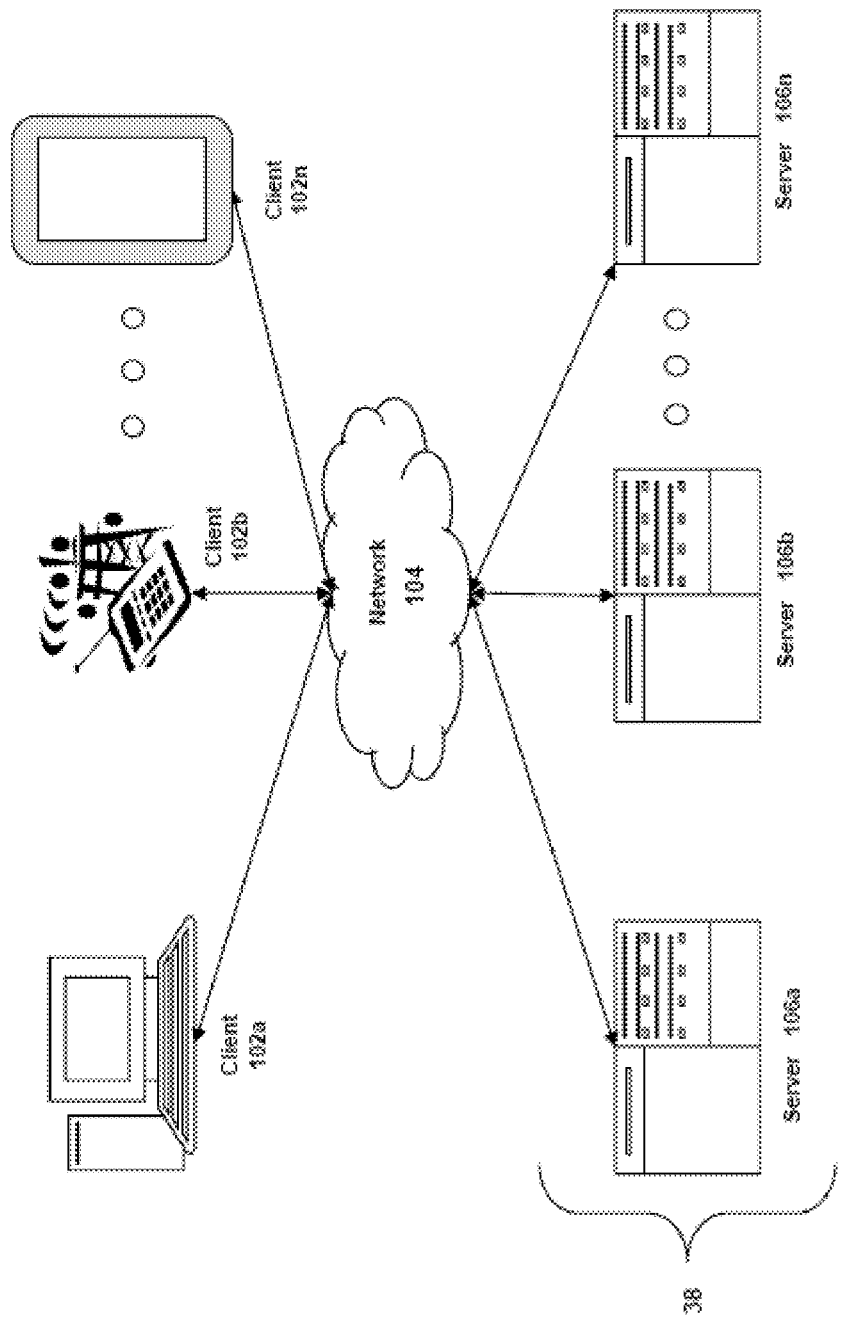
FIG. 1A is a block diagram depicting an embodiment of a network environment comprising client device in communication with server device; in accordance with an implementation of the present disclosure.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
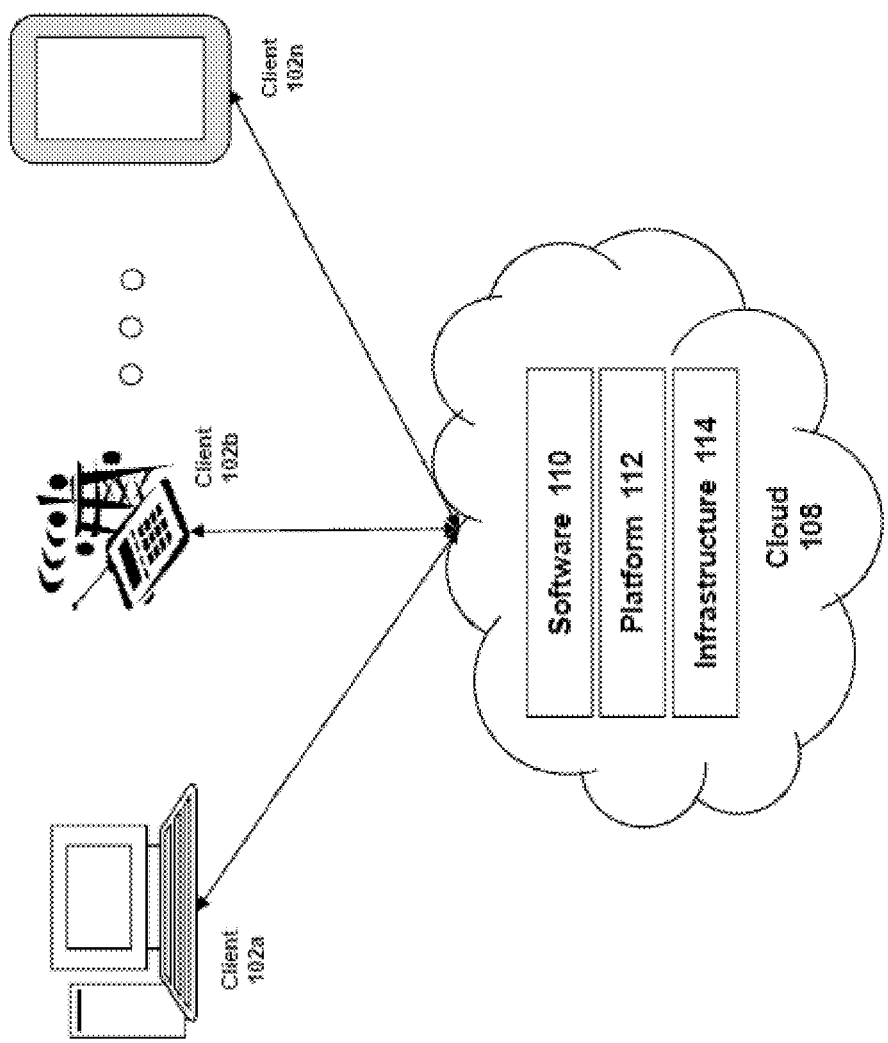
FIG. 1B is a block diagram depicting a cloud computing environment comprising client device in communication with cloud service providers; in accordance with an implementation of the present disclosure.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washi., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
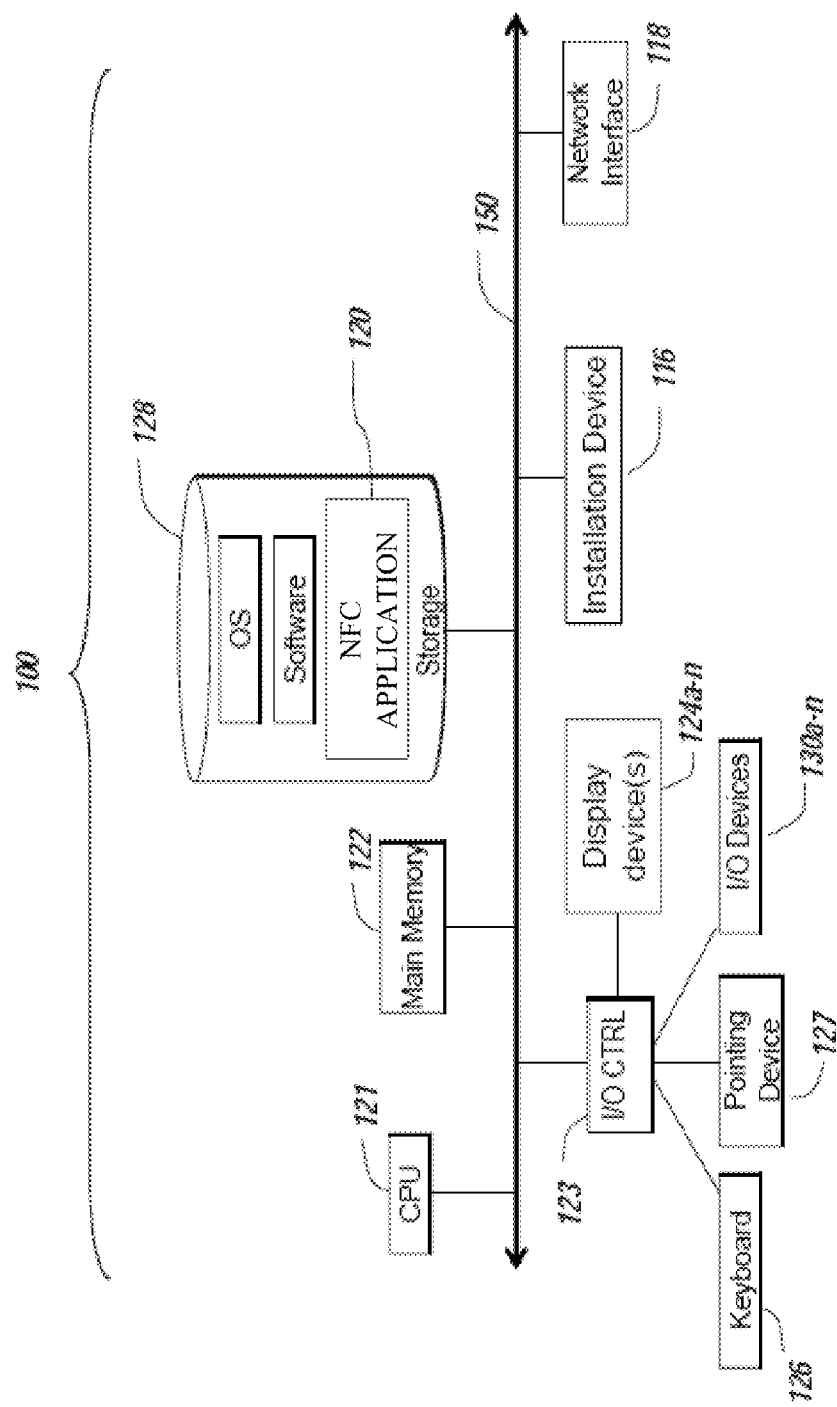
FIGS. 1C and 1D are block diagrams depicting embodiments of computing devices useful in connection with the methods and systems described herein; in accordance with an implementation of the present disclosure.
Figure 1D:
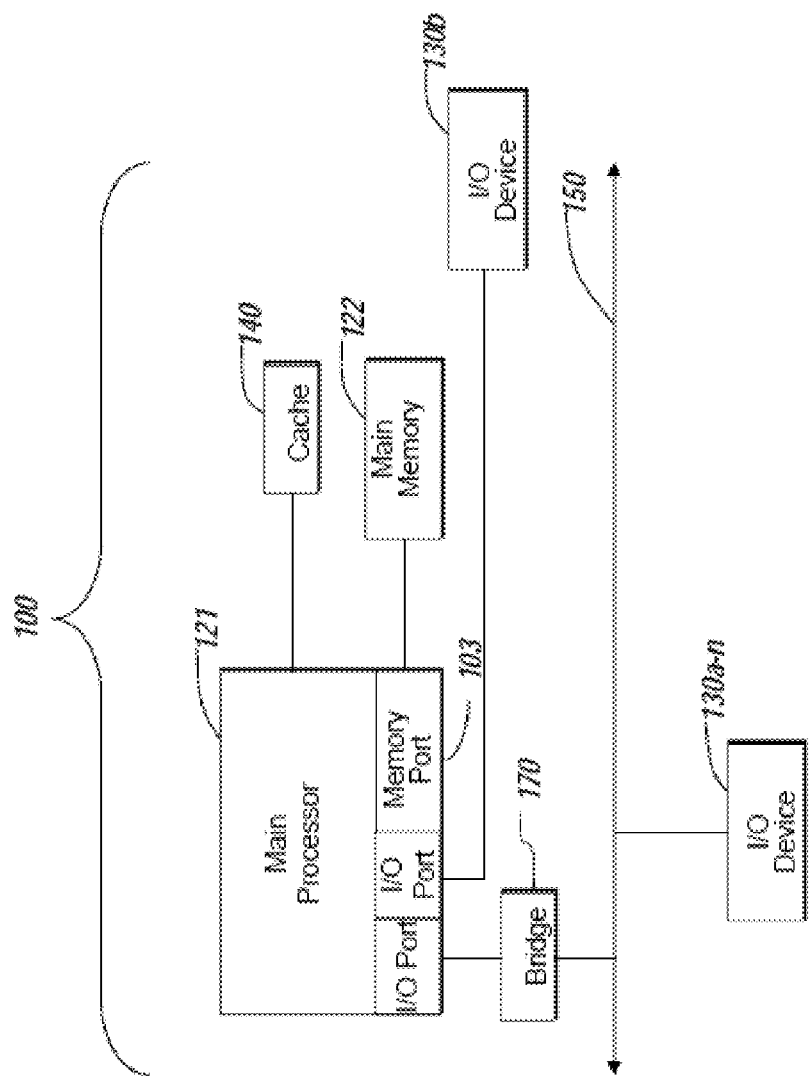

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of the NFC application 120, such as agent 212. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the NFC application. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Authenticating and Updating a NFC Chip Over a Network An NFC chip is able to store various types of data allowing NFC chips to be used in a wide variety of applications. Examples of the types of data an NFC chip can store include static information, such as a bank account number or bank card data, or dynamic information—for example, a remaining bank balance, credit values, amongst others. The data stored on a NFC chip can be updated by providing the updated data to the NFC chip in an online environment in which the uploading device as well as the device coupled to the NFC chip are in an online connection with each other through the NFC operational/supporting architecture.

The present solution allows an NFC back-end server to remotely store data to an NFC chip without requiring the NFC back-end server and NFC chip to be in communication through an NFC operational architecture. The present disclosure utilizes an intermediary device (such as a smartphone or other device with NFC reading and writing capability like point-of-sale (POS) terminal with NFC extension) configured to relay communications between the NFC chip and the NFC back-end server across a plurality of different networks such that the NFC back-end server can store data to the NFC chip without requiring the need for the NFC chip to establish direct connection with the NFC back-end server through the NFC operational/supporting architecture. In some implementations the present disclosure can also establish an end-to-end security solution between the NFC chip and the NFC back-end server, reducing the faults and/or data loss failures of the data transmission to zero.

The present solution also enables a mobile device, such as a smart phone, to emulate a NFC medium. In some implementations, a NFC medium is presented to a NFC chip to transfer data between the NFC medium and the NFC chip. The transferred data may be used, for example, to authenticate a user or in a contactless payment system. In the present solution, the mobile device, emulating a NFC medium, may be presented to a NFC chip. The mobile device may then establish a secure communication link between a NFC server and the NFC chip. The device can act as a proxy between the NFC server and the NFC chip such that the NFC server may bidirectional communicate with the NFC chip. In some implementations, the NFC server provides to the NFC chip data that would typically be stored on a NFC medium. In some implementations, the user of the device's interact with the NFC chip is not dependent solely on possession of the NFC medium but also the user's ability to authenticate with the NFC server. For example, the NFC server may request a password from the user prior to providing a key to the NFC chip.

The present disclosure can rely on an online architecture that includes an NFC chip, an NFC back-end server, an intermediary device that can communicate with the NFC chip, and the NFC back-end server, which can be any type of server that may desire to update data stored on the NFC chip. Examples of such back-end servers can include a banking card server or other value carrier medium issuer and registration server.

Figure 2:
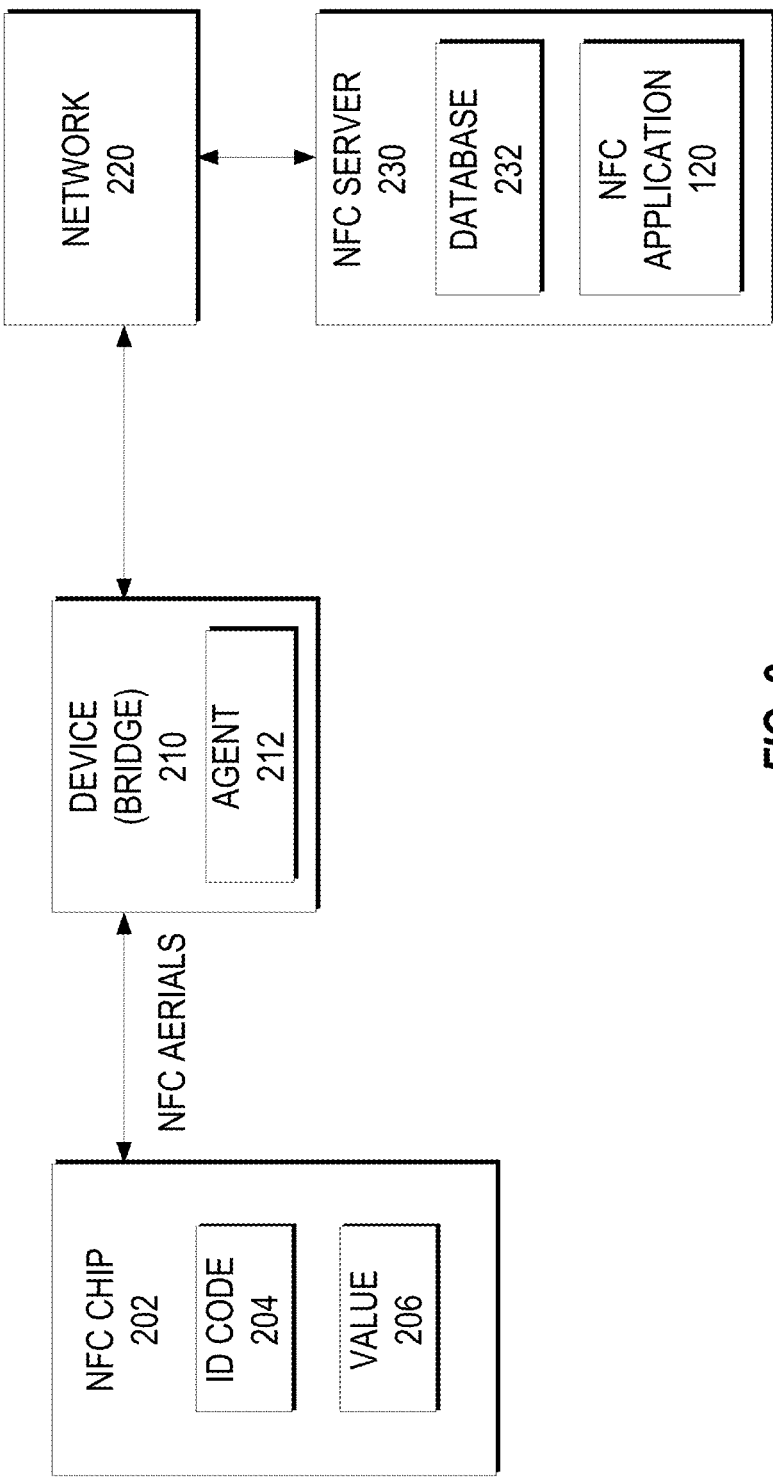
FIG. 2 is a block diagram of a system for authenticating and updating a near-field-communication (NFC) chip over a network in accordance with an implementation of the present disclosure.
Figure 3:
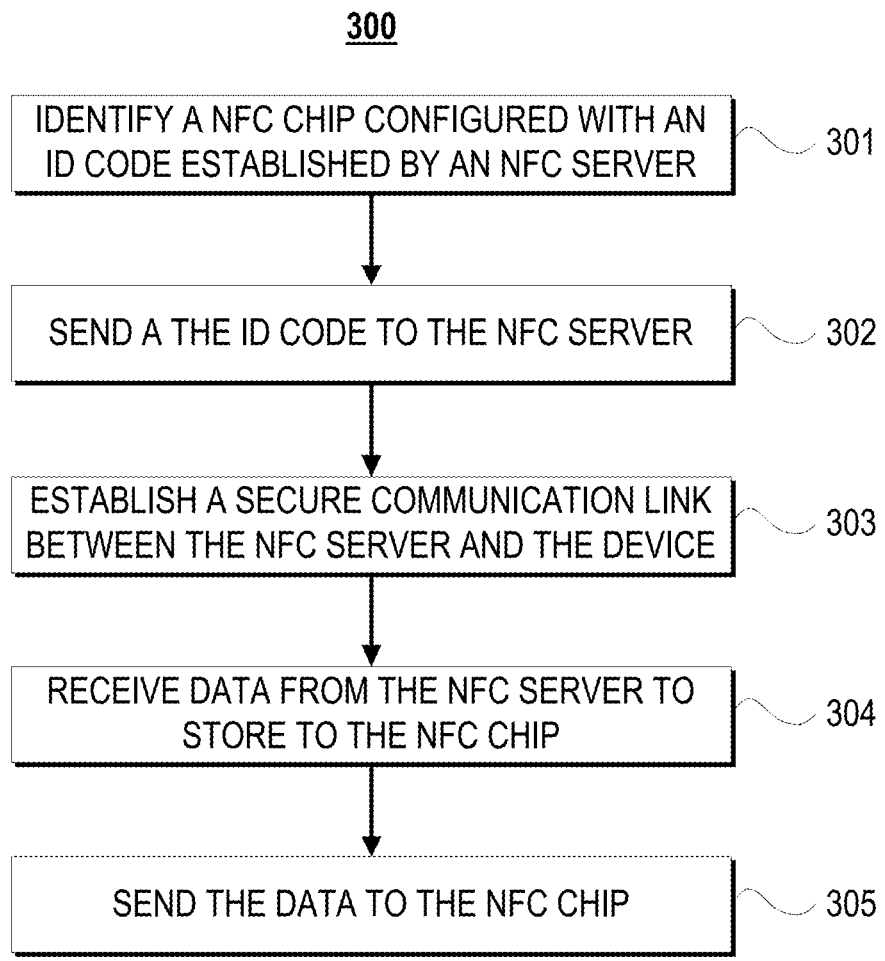
FIG. 3 illustrates a block diagram of a method for authenticating and updating a NFC chip over a network in accordance with an implementation of the present disclosure.

Referring now to FIGS. 2-3, the systems and methods of the architecture, process and implementation of authenticating and updating a NFC chip over a network will be described. In general, FIG. 2 depicts an environment for authenticating an updating a NFC chip over a network. The system illustrated in FIG. 2 enables data typically stored on the NFC chip to be disconnected (e.g., stored in a secure, remote location) from the NFC chip. For example, the bank account balance that may typically be stored on a debit card with a NFC chip may be stored on a NFC back end server. The data may then be stored and managed independently of the NFC chip. When needed, the NFC data may be transferred to the NFC chip through a user's mobile device (or other device capable of reading and writing to a NFC medium). In some implementations, the system illustrated in FIG. 2 can enable the management of the data on the NFC chip as if the NFC chip was integrated into the user mobile phone. In some implementations, a plurality of NFC chips can be managed by the same mobile device. In some implementations, bidirectional communication can occur between the NFC chip and the NFC server through the user's mobile device.

The environment illustrated in FIG. 2 can include an NFC chip 202, a mobile device 210, such as a smartphone, a network 220, and an NFC back-end server 230. The mobile device 210, such as via agent 212, can serve as a bridge, proxy or intermediary between the NFC chip 202 and the NFC server 230. The mobile device 210 can be configured to communicate with the NFC chip via NFC aerials or antennas. The mobile device 210 can be configured to communicate with the NFC server via a network, such as a mobile or cellular network, for example, GSM or WiFi. In some implementations, the mobile device via the agent 212 establishes a first communication channel, session or connection with the NFC chip and a second communication, channel, session or connection with the NFC server and associates the two for sending and receiving data between the NFC chip and the NFC server. In some implementations, the mobile device via agent 212 proxies data communicated over a communication channel, session or connection between the NFC chip and the NFC server or between the agent and the NFC server.

The NFC chip 202 can be designed, constructed or configured to store the identification code 204 and one or more values 206. The NFC chip may be embedded, installed, integrated or manufactured into the device, or external to the device. In some implementations, the NFC chip may be an electronic card, device or peripheral in electronic or electric communication or electronically/electrically coupled to the device. For example, the NFC chip may be a component of a NFC smart card, which is managed using the system and methods described herein. The values stored on the NFC chip can correspond to static information, such as a bank account number or bank card data, or dynamic information, for example, a remaining bank balance, credit values, amongst others. The NFC chip 202 can be configured to update the stored value 206 by receiving the updated value via NFC aerials that establish a connection between the NFC chip 202 and the mobile device 210. In some implementations, the mobile device 210 can provide the updated value to the NFC chip 202 responsive to receiving the updated value from the NFC server 230 over a cellular network.

In some implementations, both the NFC chip 202 and the mobile device 210 can include NFC aerials or antennas. In some implementations, the NFC aerials can be built in the NFC chip 202 and the mobile device 210.

In some implementations, the mobile device 210 can be configured to establish communications with the NFC chip 202. In some implementations, the mobile device 210 can establish communications by sending instructions to the NFC chip via NFC aerials. In some implementations, the mobile device 210, via the agent, can be configured to establish a secured link or communication channel between the NFC chip and the NFC server 230. In some implementations, the mobile device 210 and the NFC server can establish a secured link via internet or cellular based networks, such as GSM. By establishing the secured link, the NFC server 230 can send and receive information to the NFC chip 202 via the device 210. In some implementations, the device 210 acts as a secure proxy between the NFC chip and the NFC server 230.

In some implementations, the mobile device can include an agent 212 that can be configured to retrieve or identify the identification code 204 stored on the NFC chip 202. The agent 212 can further be configured to send the identification code 204 of the NFC chip 202 to the NFC server 230. In some implementations, the agent 212 can be configured to generate a data packet in which the identification code is included in the payload of the data packet and sent the data packet to the NFC server 230.

In some implementations, the agent 212 can be configured to receive data from the NFC server 230. In some implementations, the agent can be configured to identify and/or authenticate the NFC server. In some implementations, the data received by the agent 212 can include a request to update a value stored on the NFC chip 202 associated with the mobile device 210. In some implementations, the request can include information that identifies the NFC chip 202. In some implementations, responsive to receiving the request, the agent 212 can identify the NFC chip 202 to update based on the information that identifies the NFC chip 202 included in the request.

In some implementations, the agent 212 can be configured to establish a connection with the NFC chip 202 via the NFC aerials. The agent 212 can then provide the updated value included in the request to the NFC chip 202. In some implementations, the updated value is provided such that the NFC chip 202 can replace an existing value stored on the NFC chip 202 with the updated value provided by the NFC server 230. In some implementations, the agent 212 can be configured to store the updated value on the NFC chip 202. In some implementations, the agent 212 can be configured to store the updated value on the NFC chip 202 by replacing the previously stored value on the NFC chip 202 with the updated value.

Each and/or any of the components of the NFC server 230 may include or be implemented as one or more applications, programs, libraries, scripts, services, processes, tasks and/or any type and form of executable instructions executing on one or more devices, such as any of the servers 230. In some implementations, the NFC server 230 may be designed, constructed or configured to configure NFC chips, such as the NFC chip 202 with an identification code that is established by the NFC server. In some implementations, the NFC server 230 may configure the NFC chip 202 with the identification code that allows the NFC server to uniquely identify the NFC chip 202. In some implementations, the NFC server 230 can configure the NFC chip 202 with the identification code 204 when the NFC server 230 and the NFC chip 202 are locally coupled, that is, when the NFC server 230 and the NFC chip 202 are part of the same local network or are directly in communication with one another. In some implementations, the NFC server 230 may be directly in communication with the NFC chip 202 via a physical connection between the NFC server 230 and the NFC chip 202 or via a wireless connection between the NFC server 230 and the NFC chip 202.

In some implementations, the NFC server 230 can be configured to receive a data packet from the mobile device 210 associated with the NFC chip 202. In some implementations, the NFC server 230 can receive the data packet from the mobile device 210 over a secure link via the network 220. The network 220 may include cellular, internet-based networks, or a combination thereof. In some implementations, the NFC server 230 and NFC chip 202, via the mobile device 210, can establish a secure link over one or more networks 220. The secure link may comprise a security protocol such as a Secure Socket Layer (SSL) or Transport Layer Security (TLS) to establish a secure session between the device and the NFC server. The secure link may comprise any type and form of secure tunnel. The secure link may comprise any type and form of encryption of communications between the device and the NFC server.

To establish the secure link, the mobile device 210 can send a signal to the NFC server 230 to establish the connection or vice versa. In some implementations, the mobile device 210 can include the identification code of the NFC chip 202 associated with the mobile device 210. The NFC server 230 can be configured to receive the signal and identify the identification code from the signal. The NFC server 230 can be configured to determine that the identification code matches an identification code previously established by the NFC server 230. In some implementations, the NFC server 230 can authenticate the mobile device sending the signal responsive to determining that the identification code corresponds to an identification code previously established by the NFC server.

In some implementations, the NFC server 230 can be configured to identify an identification code included in the data packet. The NFC server 230 can determine whether the identified identification code matches an identification code that the NFC server previously established for storing on an NFC chip. In some implementations, the NFC server 230 can include a database 232 that includes a list of all identification codes established by the NFC server 230. In some implementations, the database 232 can include one or more entries corresponding to each NFC chip for which the NFC server established an identification code. Each entry can include an identification code of the NFC chip and a device identifier of the mobile device associated with the NFC chip, such as a MAC ID, a device ID, an IMEI number, amongst others. The entry can also include a network address of the device identifier, such as a phone number or IP address. The entry can also include one or more values currently stored on the NFC chip 202 as well as one more values previously stored on the NFC chip 202.

In some implementations, the NFC server 230 can be configured to communicate with one or more other servers that may provide the NFC server 230 with values to store on the NFC chip. In some implementations, the device 210 can be configured to communicate with one or more servers. The NFC server 230 can send a request to a mobile device 210 corresponding to the NFC chip on which the NFC server 230 would like to store an updated value. The NFC server 230 can be configured to identify the mobile device 210 corresponding to the NFC chip on which the NFC server 230 would like to store an updated value by performing a lookup in the database 232 to identify the mobile device 210 corresponding to an entry associated with the NFC chip. In some implementations, each entry can be associated with a particular user identifier. In some implementations, the NFC server can identify the mobile device 210 by performing a lookup in the database 232 to identify the mobile device 210 corresponding to an entry associated with the user identifier. The NFC server 230 can initiate communications with the mobile device via one or more cellular networks. The NFC server 230 and the mobile device 210 can then establish a connection through which the mobile device 210 can receive the updated value to be stored on the NFC chip.

FIG. 3 illustrates a block diagram of a method 300 for authenticating and updating a NFC chip over a network. In brief overview, a device identifies a NFC chip (step 301). The device sends a signal that includes the identification code over a network to the NFC server (step 302). The device establishes a secure communication link over the network between the NFC server and the NFC chip in response to authenticating the NFC chip by the NFC server via the identification code (step 303). The device receives, via the secure communication link, data from the NFC server to send to the NFC chip (step 304). The device sends the data to the NFC chip (step 305).

In further details of step 301, the device identifies or detects a NFC chip. The NFC chip may be a component of the device or external to the device (e.g., a NFC smart card). In some implementations, the device can identify or detect the NFC chip via NFC aerials or antennas. In some implementations, the NFC chip of the device can store an identification code. The device may obtain the identification code stored in the NFC chip, such as at predetermined location or storage address on the NFC chip. The device may obtain the identification code responsive to detecting the presence of the NFC chip. In some implementations, the identification code can be stored on the NFC chip via a writing process. In some implementations, an NFC back-end server can send the identification code to the NFC chip when the NFC chip is locally coupled to the NFC back-end server. In some implementations, the NFC chip is locally coupled to the NFC back-end server when the NFC chip and the NFC back-end server are communicating via a local network or if the NFC chip and the NFC back-end server are physically coupled to one another.

At step 302, the device can send a signal that includes the identification code over a network to the NFC server. In some implementations, the device can send the signal responsive to identifying the NFC chip. In some implementations, the device can send the signal over a cellular or internet based network. In some such implementations, the device can create one or more data packets that include the identification code to send to the NFC server. In some implementations, the device can encapsulate the identification code within a data packet that is transmitted from the device to the NFC server over one or more networks, including a cellular network, a local area network, and a wide area network, amongst others.

At step 303, the device can establish a secure communication link over the network between the NFC server and the NFC chip. In some implementations, an agent executing on the device can establish a secure communication channel between the NFC chip and the NFC server over a network. In some implementations, the agent identifies and/or authenticates the NFC server. In some implementations, the device can establish a secure communication link (or a plurality of links) over one or more networks, including a cellular network, a local area network, and a wide area network, amongst others. In some implementations, the NFC server can identify the device providing the identification code of the NFC chip using an identifier unique to the device and the identification code associated with the NFC chip. In some implementations the NFC server can authenticate the NFC chip by receiving the identification code and comparing the received identification code to an identification code previously stored to the NFC chip.

At step 304, the device can receive, via the secure communication link, data from the NFC server to provide to the NFC chip. In some implementations, the agent executing on the device and in communication with the NFC chip receives the data to provide to the NFC chip from the NFC server. In some implementations, the agent can read and write the data to the NFC chip via NFC aerials. In some implementations, the NFC chip is part of a card in communication with the device.

At step 305, the device sends the data to the NFC chip. In some implementations, the device can send the data to the NFC chip via NFC aerials. The NFC chip may store data to predetermined locations in storage on the NFC ship. In some implementations, provided data updates an existing data element on the NFC chip with an updated value. In some implementations, the data is stored on the NFC chip as new data element with an initial value. In some implementations, the device and the NFC chip iteratively send and receive data to establish a bidirectional communication between the NFC chip and the NFC server.

Depending on the type of application, the NFC server may update via the secure end to end communication to the device, the NFC chip with data values in the context of the application. NFC chips can be used in contactless payment systems, such as for credit cards and electronic ticket smartcards, and allow mobile payment to replace or supplement these systems. NFC offers a low-speed connection with extremely simple setup, and can be used to bootstrap more capable wireless connections. NFC can be used in social networking situations, such as sharing contacts, photos, videos or files, and entering multiplayer mobile games. In the field of social networking NFC chips may be useful to exchange contacts and other files.

Figure 4:
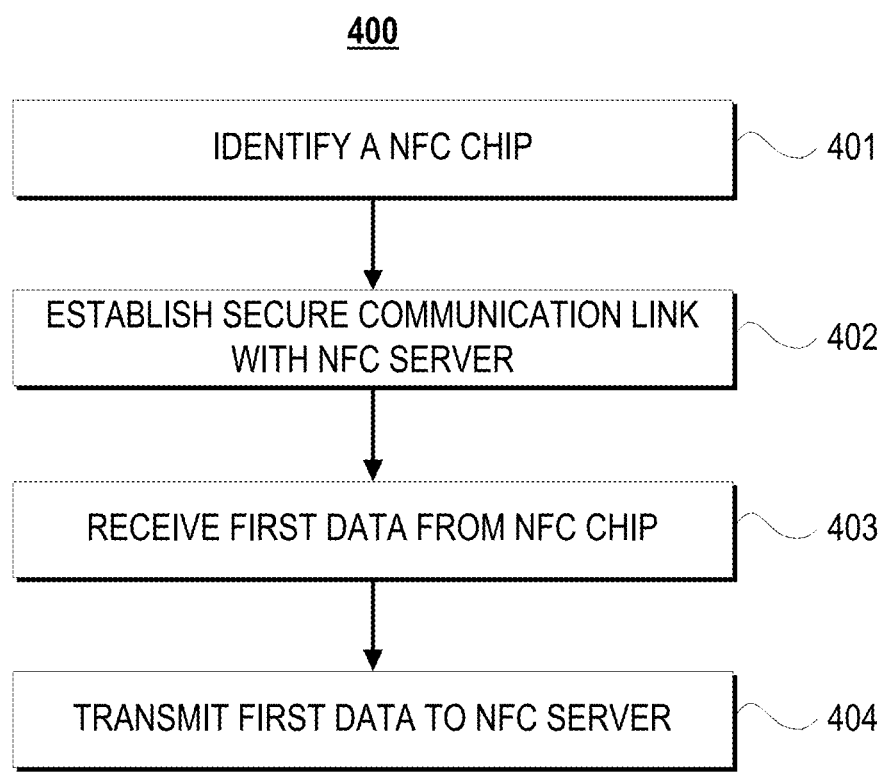
FIG. 4 illustrates a block diagram of a method for reading data from a NFC chip over a network in accordance with an implementation of the present disclosure.

FIG. 4 illustrates a block diagram of a method 400 for reading data from a NFC chip over a network. In brief overview, a device identifies a NFC chip of the device (step 401). The device establishes a secure communication link with the NFS server (step 402). The device receives data from the NFC chip (step 403) and transmits the received data to the NFC server (step 404).

As set forth above, the device identifies or detects a NFC chip (step 401). In some implementations, the device can identify or detect the NFC chip via NFC aerials or antennas. In some implementations, the NFC chip of the device can store an identification code that identifies the NFC chip to the device. In addition to the identification code, the NFC chip may store additional information such as bank balance or other banking information, identification information, or ticket information.

At step 402, the device can establish a secure communication link with the NFC server. The secure link may comprise a security protocol such as a Secure Socket Layer (SSL) or Transport Layer Security (TLS) to establish a secure session between the device and the NFC server. The secure link may comprise any type and form of secure tunnel. The secure link may comprise any type and form of encryption of communications between the device and the NFC server. In some implementations, the secure link is established between the NFC server and the NFC chip via an agent on the device, which acts as a proxy between the NFC server and the NFC chip.

A step 403, the device can receive data from the NFC chip. The device may obtain the above described data from NFC chip. In some implementations, the data is received over a wireless link made between the NFC aerials of the NFC chip and the device.

At step 404, the device can transmit the data to the NFC server. In some implementations, the data transmitted from the device the NFC server over a mobile network. In some such implementations, the device can create one or more data packets that include the identification code and other data to send to the NFC server. In some implementations, the device can encapsulate the identification code and data within a data packet that is transmitted from the device to the NFC server over one or more networks, including a cellular network, a local area network, and a wide area network, amongst others.

Figure 5:
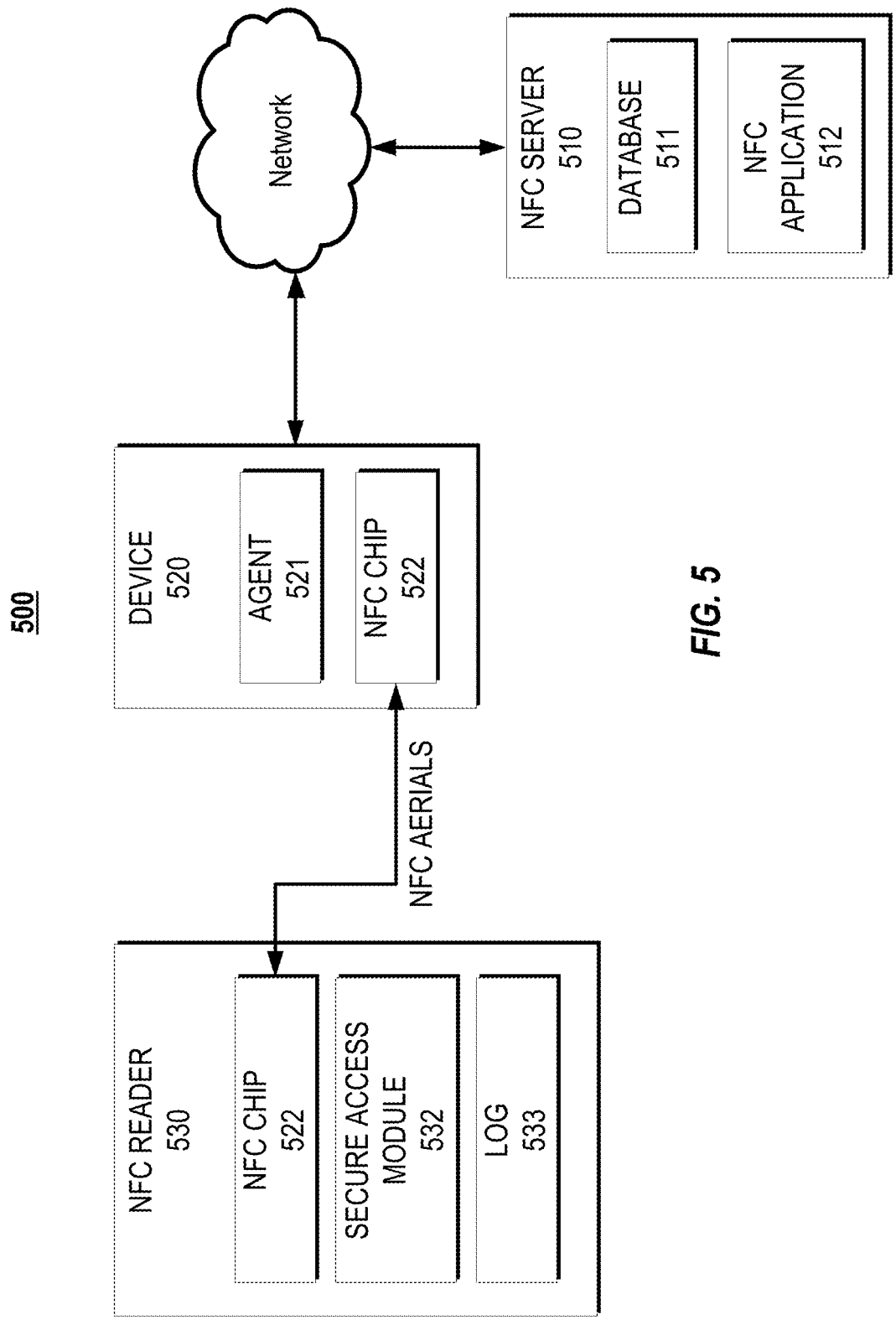
FIG. 5 illustrates a block diagram of an example system for emulating a NFC chip over a network in accordance with an implementation of the present disclosure.

FIG. 5 illustrates a block diagram of an example system 500 for emulating a NFC chip over a network. As an overview of the system 500, a device (e.g., a user's mobile phone) may include a NFC chip. The user may use the system described herein to emulate a predetermined NFC chip. For example, rather than carrying a plurality of cards (or other devices) that use NFC chips (e.g., a banking card) a user may emulate each of the plurality of cards with the system described herein. In this example, the user may approach a NFC reader/writer that is part of an ATM associated with the user's bank. Through an application on the user's mobile device, the user may authenticate himself with the NFC server. Responsive to the authentication, the NFC server may transmit the relevant NFC data to the NFC chip within the user's mobile device. The user may then present the mobile device to the ATM, which interacts with the user's mobile phone as if it was the user's banking card because the NFC chip of the mobile phone stores the NFC data of the user's banking card. In some implementations, the system 500 may establish a two way communication between the NFC reader/writer and the NFC server, via the mobile device and the mobile device's NFC chip.

Referring to FIG. 5 in greater detail, the system 500 can include a NFC server 510, which can include a database 511 and a NFC application 512. The NFC server 510 is in communication with a device 520. The device 520 can include an agent 521 and a NFC chip 522. The device can be in communication with a NFC reader 530, which can include a NFC chip 522, a secure access module 532, and a log 533.

The system 500, as illustrated, includes a NFC reader 530. The NFC reader 530 can be any type of device that includes a NFC chip 531. For example, the NFC reader 530 may be, or be a component of, a POS, a ticketing and boarding station, an ATM, a contactless payment system, or a security checkpoint. In some implementations, a user may present a NFC medium (a device including a NFC chip, such as a NFC smart card) to the NFC reader 530 to authenticate with the NFC reader 530. The term authenticate is used generically to refer to the successful transmission of data between two NFC chips. For example, a user may present a security badge, which includes a NFC chip to a NFC reader. The NFC chip of the badge may include an identification number that, when presented to the NFC reader 530, provides the user with access to a restricted area. In some implementations, the NFC reader 530 may read the identification number, or key, stored on an NFC medium. The key may be passed to an access module 532, which compares the key against the log 533. If the key is found on in the log 533, then the bearer of the NFC medium is authenticated with the NFC reader 530. The NFC chip 522 of the NFC reader 530 may also include an identification number that enables the device 520 to identify the NFC reader 530. The identification number of the NFC chip 522 of the NFC reader 530 may be a device identifier, such as a MAC ID, an IMEI number, unique identification number, IP address, or a combination thereof.

The device 520 of the system 500 can emulate the above descried NFC medium and can be used to authenticate the user of the device 520 with the NFC reader 530. The device 520 can include a NFC chip 522, which can be in communication, via the NFC chip's aerials, with the NFC chip 522 of the NFC reader 530. The agent 521 can be a program or script that sends and receives data to the NFC reader 530 via the NFC chip 522 of the device 520. In some implementations, the device 520, emulating a NFC medium does not store the required identification code or key to be authenticated with the NFC reader 530. In some implementations, the device 520 is configured to recognize the NFC chip 522 of the NFC reader 530, receiving identification from NFC chip 522 of a device 530, and begin a secure communication between the NFC server 510 and the NFC chip 522 of the NFC reader 530. The NFC server 510 may then return the required identification code or key to the device 520, which acts as a proxy and forwards the key to the NFC chip 522 of the NFC reader 530. In this configuration, the device 520 can emulate a NFC medium to authenticate with a NFC reader 530 without originally possessing the key required to authenticate with the NFC reader 530. In some implementations, the NFC server 510 can be configured to authenticate the user of the device 520 through the agent 521. For example, before a key is forwarded to the device 520 from the server 510 to be provided to the NFC reader 530, the agent 521 may prompt the user for a password. In some implementations, the NFC server 510 may forward a key to the device 520 prior to the device's recognition of the NFC reader. For example, the agent 521 may be stored on the smartphones of the employees of a company. The employees may use their smart phones to emulate NFC medium for gaining access to restricted portions of a facility. The employer may regularly update the keys required to access the restricted portions. Rather than distributing new physical NFC medium to each of the employees when the keys are changed, the employer may, through the system and methods described herein, push the new keys to the employee's smartphones such that the smart phones may emulate the new NFC medium with the new keys.

The NFC server 510 of the system 500 may be similar to the NFC server described above in relation to FIGS. 2-4. The components of the NFC server 510 may include or be implemented as one or more applications, programs, libraries, scripts, services, processes, tasks and/or any type and form of executable instructions. The NFC server 510 includes a NFC application 512 that can be in communication with the device 520. The NFC application 512 may provide identification codes or keys to the NFC chip 522 of the device 520. The NFC application can be configured to receive an identification code from the device 520, which was received by the device 520 from the NFC reader 530. The NFC server 510 may reference the identification code against the database 511 to determine what data, such as a key, to forward to the NFC reader 530, via the device 520.

Figure 6:
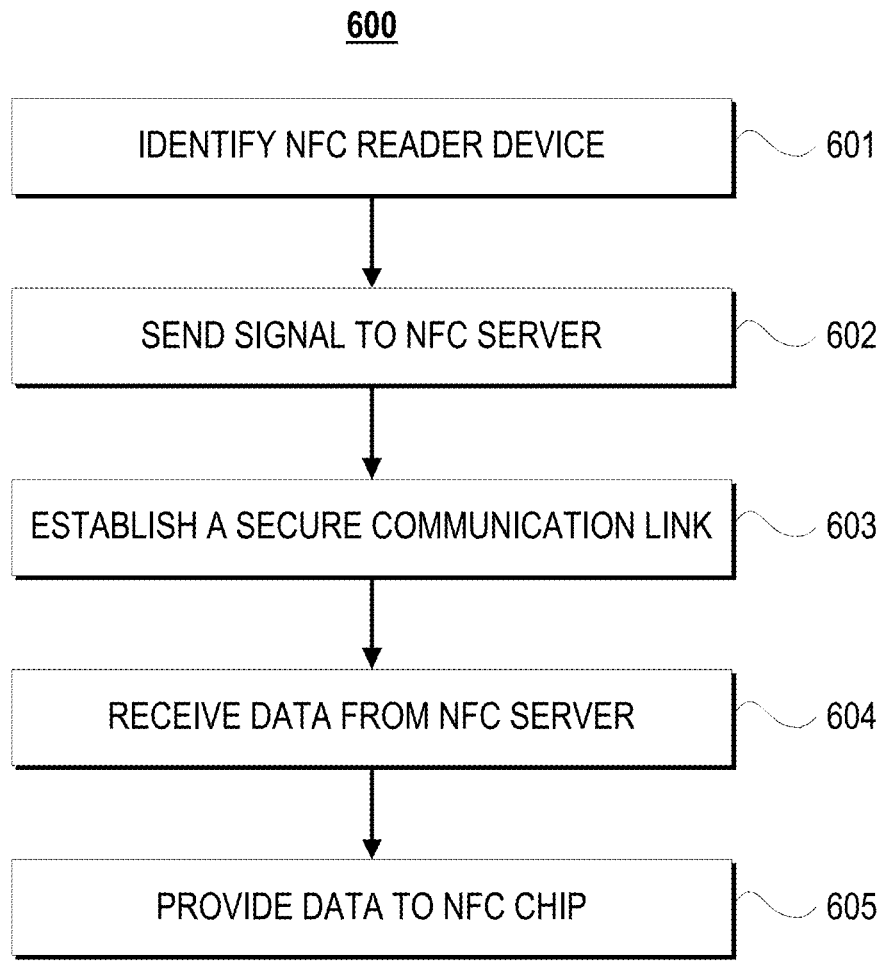
FIG. 6 illustrates a block diagram of a method emulating a NFC chip in accordance with an implementation of the present disclosure.

FIG. 6 illustrates a block diagram of a method 600 emulating a NFC chip. As an overview, the method 600 can include identifying a NFC chip of a reader device (step 601). The method can also include sending a signal over a network to a NFC server (step 602). A secure communication link can be established between the NFC server and the NFC chip (step 603). Data can then be received by the device (step 604) and provided to the NFC chip (step 605).

As set forth above, the method 600 can include identifying a NFC chip of a reader device (step 601). In some implementations, the NFC chip is identified by a device, such as a smartphone or other mobile device. The device may also include a NFC chip and be configured to send and receive data with other NFC chips, wirelessly through NFC aerials. The NFC chip of the reader device may include a unique identification number. The identification number may be used by the device or the NFC server to uniquely identify the reader device. In some implementations, the identification number of the NFC chip of the NFC reader is transferred to the device though magnetic induction created between the aerials of the NFC chip of the device and reader, when the device and reader are proximately located to one another.

At step 602, the identification number is transmitted from the device to a NFC server. In some implementations, the reader device may expect a predetermined response back from the device once the device receives the identification number from the reader. For example, the reader device may be contactless payment kiosk and may require a key number of an authenticated user (e.g., the holder of the device) before transferring funds. The device may transmit the identification number from the reader device to the NFC server. The server may then select a key associated with the identification number from a database.

At step 603, a secure communication link is established with the NFC chip of the reader device through the device. The secure communications link can be established, via the device, between the NFC chip of the reader device and the NFC server over one or more networks, including a cellular network, a local area network, a wide area network, or a combination thereof. In some implementations, the user of the device authenticates with the NFC server before the secure communication link is established. For example, the user may present the device to a NFC reader. The NFC reader may transmit an identification to the device, which is forwarded to the NFC server by the device. Responsive to receiving the signal and identification number from the device, the NFC server may request that the user of the device authenticate with the NFC server by entering a password, pin, biometric identification, or other form of identification. The user authentication may be sent to the NFC server by the agent executing on the device. If the user does not (or cannot) authenticate with the NFC server, the method 600 may end.

At step 604, data is transmitted to the device. In some implementations, once the secure communication is established, the device acts like a proxy between the NFC chip of the reader device and the NFC server. Data may be provided to the device from the NFC server to be forwarded to the NFC chip. In some implementations, the device may forward the data to the NFC chip of the reader device without storing or altering the data. For example, if the server is providing the NFC chip of the reader device with a key, the key may not be stored on the device after it is presented to the NFC chip of the reader device.

At step 605, the device provides the data to the NFC chip of the reader device. Responsive to establishing the secure communication between the NFC chip and the NFC server, the device can provide the data to the NFC reader. In some implementations, by presenting the key to the NFC reader, the device emulates a NFC medium to the NFC reader. The device may act as proxy to transmit additional data between the NFC chip of the reader device and the server—for example, enabling bidirectional communication between the NFC chip of the NFC reader and the NFC server.

Bidirectional communication between the NFC chip (or the NFC reader) and the NFC server can include the transmission of data from the NFC server to the NFC chip (or the NFC reader) and transmission of data from the NFC chip (or the NFC reader) to the NFC server. As an example of bidirectional communication, a user may wish to use a mobile device to emulate a banking card, which may store an indication of the user's bank balance. In this example, the first leg of the bidirectional communication may include the user authenticating with the NFC server such that NFC data is provided to the mobile device. The provided NFC data enables the mobile device to emulate the user's banking card. The mobile device, emulating the banking card, may transfer to the ATM, via the mobile phone's NFC aerials. In some implementations, the transmission of additional data may require additional authentication by the user of the device to the NFC server.

While the invention has been particularly shown and described with reference to specific embodiments, it should be understood by those skilled in the art that various changes in form and detail may be made therein without departing from the spirit and scope of the invention described in this disclosure.

What is claimed:

1. A method of emulating a near-field-communication (NFC) chip over a network, the method comprising:
    (a) identifying over a wireless link, by a device intermediary to a reader device and a near-field-communication (NFC) server, a NFC chip of the reader device, the NFC chip configured with an identification code to uniquely identify the reader device;
    (b) sending, by the device, a signal over a network to the NFC server, the signal comprising the identification code;
    (c) establishing a secure communication link between the NFC server and the NFC chip through the device responsive to authenticating the device by the NFC server;
    (d) receiving, by the device via the secure communication link, data from the NFC server to provide to the NFC chip; and
    (e) providing, by the device via the secure communication link, the data to the NFC chip.

2. The method of claim 1, further comprising writing, by the NFC server, the identification code to the NFC chip when the NFC chip is locally coupled to the NFC server.

3. The method of claim 1, wherein (a) further comprises identifying, by the device, the NFC chip via NFC aerials.

4. The method of claim 1, wherein (b) further comprises sending, by the device, the signal responsive to identifying the NFC chip.

5. The method of claim 1, wherein (b) further comprises sending, by the device, the signal over a mobile network.

6. The method of claim 1, wherein (c) further comprises establishing, by the NFC server and an agent executing on the device, the secure communication channel over a mobile network.

7. The method of claim 1, wherein (c) further comprises identifying, by the NFC server, the device and using an identification of the device with the identification code to authenticate the device.

8. The method of claim 1, wherein (d) further comprises receiving, by an agent executing on the device and in communication with the NFC chip, the data.

9. The method of claim 8, further comprising writing, by the agent, the data to the NFC chip via NFC aerials.

10. A system of emulating a near-field-communication (NFC) chip over a network, the system comprising:
    a device intermediary to a reader device and a near-field-communication (NFC) server, the device configured to identify a NFC chip of the reader device over a wireless link and transmit a signal over a network to the NFC server;
    the NFC server configured to authenticate the device and establish a secure communication link, via the device, with the NFC chip of the reader device responsive to authenticating the device; and wherein the NFC server is configured to transmit data to the device, and the device is configured to provide the data to the NFC chip.

11. The system of claim 10, wherein the NFC server is configured to write the identification code to the NFC chip when locally coupled with the NFC chip.

12. The system of claim 10, wherein the device is further configured to identify the NFC chip via NFC aerials.

13. The system of claim 10, wherein the device is further configured to send the signal responsive to identifying the NFC chip.

14. The system of claim 10, wherein the device is further configured to send the signal over a mobile network.

15. The system of claim 10, wherein the NFC server and an agent executing on the device are configured to establish the secure communication channel over a mobile network.

16. The system of claim 10, wherein the NFC server is further configured to identify the device and to use the identification of the device with the identification code to authenticate the NFC chip.

17. The system of claim 10, wherein an agent executing on the device and in communication with the NFC chip is configured to receive the data.

18. The system of claim 17, wherein the agent is further configured to write the data to the NFC chip via NFC aerials.

19. A method of updating a near-field-communication (NFC) chip over a network, the method comprising:
identifying over a wireless link, by a device intermediary to a reader device and a near-field-communication (NFC) server, NFC a chip of the reader device;
establishing, by the device, a secure communication link between the NFC server and the device;
receiving, by the device, a first data from the NFC chip to be transmitted to the NFC server; and
transmitting, by the device, the first data received from the NFC chip to the NFC server over the secure communication link.

20. The method of claim 19, further comprising identifying, the NFC chip by an identification code that uniquely identifies the NFC chip.

21. The method of claim 19, further comprising identifying NFC chip via NFC aerials.

22. The method of claim 19, further comprising establishing the secure communication link between the NFC server and the device over a mobile network.

23. The method of claim 19, further comprising receiving a second data from the NFC server responsive to the NFC server receiving the first data from the device.

24. The method of claim 23, further comprising transmitting, by the device, the second data to the NFC chip.

25. The method of claim 23, further comprising writing, by an agent executing on the device, the second data to the NFC chip.

26. The method of claim 19, further comprising, establishing by an agent executing on the device, the secure communication link.

27. A system of updating a near-field-communication (NFC) chip over a network, the system comprising:
a device intermediary to a reader device and a near-field-communication (NFC) server, the device configured to:
identify a NFC chip of the reader device over a wireless link;
transmit a signal over a network to the NFC server; and
receive a first data from the NFC chip to be transmitted to the NFC server over the network; and
the NFC server configured to receive the first data from the device and transmit a second data to the device responsive to receiving the first data.

28. The system of claim 27, the device further configured to transmit the second data to the NFC chip.

29. The system of claim 27, the device further configured to identify the NFC chip by an identification code that uniquely identifies the NFC chip.

30. The system of claim 27, the device further comprising an agent configured to establish a secure communication link between the NFC server and the device over a mobile network.

31. The system of claim 27, the device further configured to write the second data to the NFC chip.

* * * * *